United States Patent [19]

Zaid

[11] Patent Number: 4,839,086

[45] Date of Patent: Jun. 13, 1989

[54] COMPOSITION FOR REGENERATING CATION EXCHANGE RESIN

[76] Inventor: Najib H. Zaid, 213 Monroe, Sterling, Kans. 67579

[21] Appl. No.: 155,208

[22] Filed: Feb. 12, 1988

[51] Int. Cl.$^4$ .......................... C09K 3/00; C11D 7/08
[52] U.S. Cl. ................... 252/182.3; 210/674; 252/142; 252/174.19; 252/558; 521/26
[58] Field of Search ............... 252/182.3, 174.19, 558, 252/142; 210/674; 521/26

[56] References Cited

U.S. PATENT DOCUMENTS

| | | | |
|---|---|---|---|
| Re. 26,343 | 2/1968 | Reid et al. | 210/674 |
| 2,769,787 | 11/1956 | Diamond | 210/674 |
| 3,216,932 | 11/1965 | Heiss | 210/32 |
| 3,406,113 | 10/1968 | Anderson | 210/674 |
| 3,454,503 | 7/1969 | Blankenhorn et al. | 210/674 |
| 3,536,637 | 10/1970 | Noll et al. | 210/674 |
| 3,748,285 | 7/1973 | Wiltsey et al. | 252/531 |
| 3,887,498 | 6/1975 | Kuhajek et al. | 210/674 |
| 3,951,877 | 4/1976 | Okumura et al. | 252/174.19 |
| 4,009,114 | 2/1977 | Yurko | 252/109 |
| 4,071,446 | 1/1978 | Kunin | 521/26 |
| 4,116,860 | 9/1978 | Kunin | 252/194 |
| 4,203,873 | 5/1980 | Suzuki et al. | 252/558 |
| 4,323,465 | 4/1982 | Downey et al. | 252/102 |
| 4,420,412 | 12/1983 | Wong | 252/186.38 |
| 4,540,715 | 9/1985 | Waatti et al. | 521/26 |
| 4,612,137 | 9/1986 | Kuroda et al. | 252/142 |
| 4,664,811 | 5/1987 | Operhofer | 210/674 |
| 4,749,508 | 6/1988 | Cockrell et al. | 252/142 |

*Primary Examiner*—Edward A. Miller
*Attorney, Agent, or Firm*—Hovey, Williams, Timmons & Collins

[57] ABSTRACT

The invention is concerned with the improved compositions for the treatment and regeneration of ion exchange resin beds typically used in water softening systems for domestic or industrial applications. The compositions of the invention include those designed for addition to sodium chloride to yield a final regenerating medium for exchange resins, along with finished compositions including a preponderant proportion of sodium chloride. In pertinent part, the compositions of the invention include respective quantitites of citric acid and a salt of citric acid such as sodium or potassium citrate. In particularly preferred form, the compositions include a minor amount of an anti-caking agent selected from the group consisting of alkyl substituted napthalene sulfonates. The compositions in accordance with the invention are characterized by relatively low pH levels and the ability to minimize the oxidation of ferrous iron to the insoluble ferric form.

19 Claims, No Drawings

COMPOSITION FOR REGENERATING CATION EXCHANGE RESIN

BACKGROUND OF THE INVENTION

1. Field of the Invention

The present invention is broadly concerned with compositions useful for the regeneration of cation exchange resins typically used in household or industrial contexts for the softening of water. More particularly, it is concerned with the improved regenerative compositions including minor amounts of citric acid and a salt of citric acid (e.g., sodium citrate), together with an anti-caking agent in the form of an alkyl substituted napthalene sulfonate.

2. Description of the Prior Art

Water softening systems have long been used in households and by industry to replace hardness cations such as calcium and mangnesium with sodium ions. This is accomplished by passing an incoming water supply through a bed of sodium charged cation exchange resin beads or particles. As the water passes through the cation exchange resin bed, the incident hardness cations are exchanged for the sodium ions of the bed. In the course of time, the ion exchange resin bed becomes saturated with hardness cations removed from the incoming water, and it is necessary to recharge the bed by passing a brine solution primarily consisting of sodium chloride through the resin bed. This replenishes the bed with sodium ions and removes the unwanted calcium, magnesium, or other ions previously removed from the treated water.

Over time, the exchange capacity of an ion exchange resin bed deteriorates as impurities in the incoming water collect in the resin bed and are not removed by periodic recharging. At some point, depending primarily on the characteristics of the incoming water supply, the resin bed becomes unacceptably "fouled", i.e., the resin bed's capacity to soften water has been diminished to an extent that it must be specially treated to restore softening capacity.

Although a number of factors can lead to fouling of an ion exchange resin bed, perhaps the greatest single contributing factor is the presence of iron in an incoming water supply. Iron can exist in several valence states in water, the most common being the ferrous and ferric states. It is most desirable to maintain the iron in the ferrous state, inasmuch as ferrous iron can readily be removed during conventional resin bed regeneration. However, ferrous iron tends to become oxidized to the ferric state after being exchanged onto a resin bed, which then makes its removal very difficult and can cause the resin beads to split.

In the case of certain relatively high pH regenerating compositions, the resulting brine solutions are cloudy because of the presence of carbonates. In use, these carbonates can be effectively "filtered" by the resin beads thus lowering the bed efficiency and contributing to the need for frequent bed regeneration.

A number of prior compositions have been proposed for use as ion exchange resin bed regenerants. For example, U.S. Pat. No. 4,540,715 describes the use of a surfactant and an alkali metal citrate in a regenerating composition. Other prior systems have made use of citric acid as a sequestering agent for iron. These prior compositions have proven less than entirely satisfactory, however, principally because of their inability to properly control the iron problems described previously.

SUMMARY OF THE INVENTION

The present invention overcomes the difficulties described above and provides a greatly improved composition for the regeneration of cation exchange resin beds. Broadly speaking, the invention comprehends a composition designed for addition to sodium chloride to yield a regenerating medium for cation exchange resins. The composition comprises from about 0.1 to 10% by weight of citric acid, from about 0.01 to 1% by weight of an anti-caking agent, the latter being an alkyl substituted napthalene sulfonate, and at least about 50% by weight of a salt of citric acid (more preferably from about 70 to 99% by weight). A very important feature of the composition stems from the fact that the pH of a saturated solution thereof in water at room temperature is within a range of from about 4 to 8, and more preferably from about 5 to 7. This relatively low pH is believed important in maintaining the ferrous iron in the divalent state, so as to better control the build up of iron ions in ion exchange resin beds.

In another aspect of the invention, final compositions used for the regeneration of cation exchange resin beds are provided. Such complete compositions include a preponderant quantity of sodium chloride, together with respective minor amounts of citric acid and a salt of citric acid mixed with the sodium chloride. In preferred forms, such final compositions also include an alkyl substituted sulfonate anti-caking agent, which has been found important in the prevention of unwanted caking of the final composition.

DESCRIPTION OF THE PREFERRED EMBODIMENTS

The most preferred composition designed for addition to sodium chloride to yield a complete regenerating medium for cation exchange resins includes about 1% by weight of anhydrous citric acid, about 0.1% by weight of an alkyl substituted napthalene sulfonate, and with the balance (98.9% by weight) of the composition being a salt of citric acid. Most advantageously, the salt of citric acid is an alkali metal salt, most preferably either sodium or potassium citrate or mixtures thereof.

Anti-caking agents are preferably selected from compounds of the formula

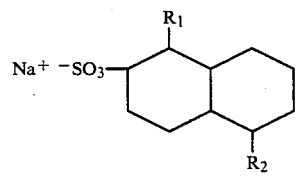

wherein $R_1$ and $R_2$ are respectively selected from the group consisting of hydrogen and alkyl groups having from 1 to 4 carbon atoms, inclusive, with at least one of $R_1$ and $R_2$ being an alkyl group. The single most preferred anti-caking agent in accordance with the foregoing formula is a mixture of mono and dimethyl napthalene sulfonate sodium salts. This composition is sold by Desoto, Inc., of Des Plaines, Ill. under the designation "Petro AG Special Superfine Powder".

The final regenerating compositions in accordance with the invention include a preponderance of sodium chloride, i.e. from about 99.0 to 99.9% by weight sodium chloride, and more preferably from about 99.5 to 99.75% by weight thereof. In addition, such final compositions include a minor amount of citric acid, namely, from about 0.0002 to 0.025% by weight, and more preferably from about 0.0012 to 0.0037% by weight. A salt of citric acid is also present in these final compositions, with the salt being present at a level of from about 0.225 to 0.249% by weight, and more preferably from about 0.246 to 0.247% by weight. Salts of citric acid should be selected from the alkali metal salts, and most advantageously from the group consisting of sodium and potassium citrate and mixtures thereof.

The final regenerating compositions should also in preferred forms include the alkyl substituted sulfonate anti-caking component, and such should be present at a level of from about 0.0001 to 0.025% by weight, and more preferably from about 0.0022 to 0.0012% by weight.

In preparative procedures, the compositions designed for addition to sodium chloride are produced by initially blending anhydrous citric acid with the solfonate anti-caking agent in an upright rotating blender. Following thorough mixing of these two components, the citric acid salt is then added, followed by further blending to assure homogeneity. This preblended, dry material can then be used to manufacture final regenerative compositions. Such a procedure would involve initial blending of the material with a preponderant amount of sodium chloride, followed by a conventional pelletizing procedure to yield pellets comprising primarily sodium chloride, but with the important adjuncts of the present invention homogeneously mixed and compacted therewith.

Final compositions can then be dissolved in water and used on a routine basis for the regeneration and treatment of ion exchange resin beds. That is to say, the advantages of the present invention are maximized when the final compositions hereof are used on a routine basis, rather than only when beds become unacceptably fouled.

Among the many advantages of the present invention are the fact that the relatively low pH levels maintained by the compositions assists in the maintenance of iron ions in the desirable ferrous state and gives treatment solutions which are very clear and substantially free of carbonate precipitates. This in turn means that the carbonates are not "filtered" on the resin beads to lower cycle time between bed regenerations. Thus, resin beds operate for a longer period of time without the necessity of replenishment or further special treatment.

I claim:

1. A composition for addition to sodium chloride to yield a regenerating medium for cation exchange resins, said composition comprising:
   from about 0.1 to 10% by weight of citric acid;
   from about 0.01 to 1% by weight of an anti-caking agent for said regenerating medium, said agent being an alkyl substituted napthalene sulfonate; and at least about 50% by weight of a salt of citric acid, the pH of a saturated solution of said composition in water at room temperature being from about 4 to 8.

2. The composition of claim 1, said salt being an alkali metal salt of citric acid.

3. The composition of claim 2, said salt being selected from the group consisting of sodium and potassium citrate.

4. The composition of claim 1, said pH being from about 5 to 7.

5. The composition of claim 1, said salt being present at a level of from about 70 to about 99% by weight.

6. The composition of claim 1, said salt of citric acid constituting the balance of said composition.

7. The composition of claim 1, said citric acid being present at a level of about 1%, said agent being present at a level of about 0.1% by weight, with said salt constituting the balance of the composition.

8. The composition of claim 1, said agent being selected from compounds of the formula

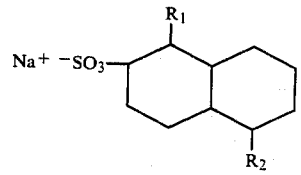

wherein R and $R_1$ are respectively selected from the group consisting of hydrogen and alkyl groups having from 1 to 4 carbon atoms, inclusive, with at least one of $R_1$ and $R_2$ being an alkyl group.

9. The composition of claim 8, said agent being a mixture of mono and dimethyl napthalene sulfonate sodium salts.

10. A composition for regenerating a cation exchange resin, comprising:
    a quantity of sodium chloride;
    respective minor amounts of citric acid and a salt of citric acid admixed with said sodium chloride.

11. The composition of claim 10, said citric acid being present at a level of from about 0.0002 to 0.025% by weight.

12. The composition of claim 10, said salt of citric acid being present at a level of from about 0.225 to 0.249% by weight.

13. The composition of claim 10, said salt of citric acid being an alkali metal salt.

14. The composition of claim 13, said salt being selected from the group consisting of sodium and potassium citrate.

15. The composition of claim 10, said sodium chloride being present at a level of from about 9.0 to 99.9% by weight.

16. The composition of claim 10, including an alkyl substituted sulfonate in said composition.

17. The composition of claim 16, said sulfonate being a mixture of mono and dimethyl napthalene sulfonate sodium salts.

18. The composition of claim 16, said sulfonate being present at a level of from about 0.0001 to 0.025% by weight.

19. The composition of claim 10, said composition being in the form of compacted pellets.

* * * * *